June 26, 1962 D. BROWN 3,040,979
SLIP COMPENSATOR FOR MECHANICAL INTEGRATORS
Filed March 31, 1960
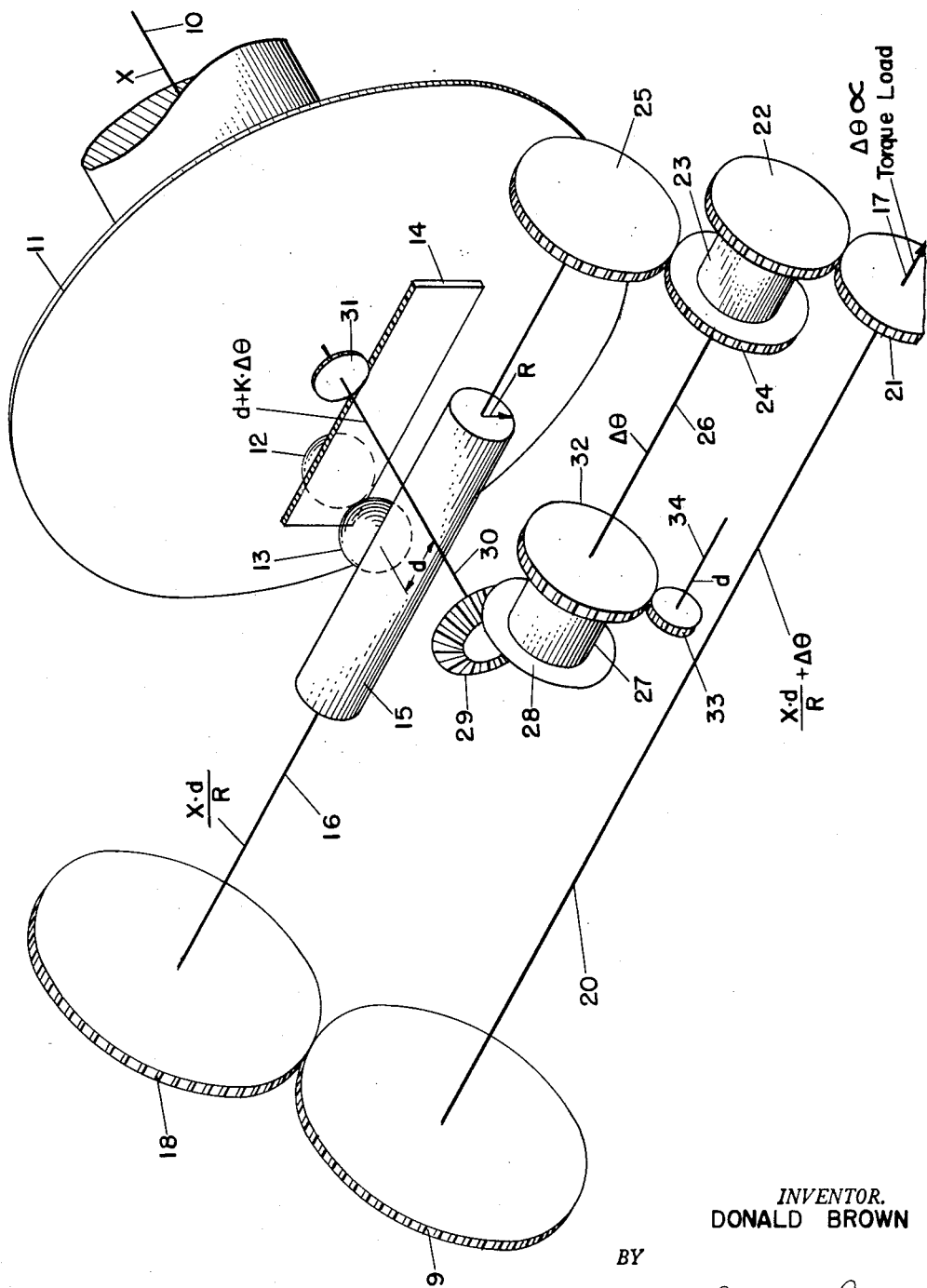
INVENTOR.
DONALD BROWN
BY

United States Patent Office 3,040,979
Patented June 26, 1962

3,040,979
SLIP COMPENSATOR FOR MECHANICAL INTEGRATORS
Donald Brown, Morris Plains, N.J., assignor to the United States of America as represented by the Secretary of the Army
Filed Mar. 31, 1960, Ser. No. 19,130
2 Claims. (Cl. 235—61)
(Granted under Title 35, U.S. Code (1952), sec. 266)

The invention described herein may be manufactured and used by or for the Government for governmental purposes without the payment to me of any royalty thereon.

This invention relates to mechanical integrators of the ball and disk type, and more especially to means for minimizing the errors heretofore produced by slippage between the rotational parts of such integrators.

The conventional ball and disk integrator is used extensively in mechanical analogue computing systems. It includes a disk, two balls and a cylinder, all of which are finished to a high degree of surface quality and dimensional accuracy. These parts are held in contact by a spring which provides the necessary frictional force to permit the transmission of motion. The balls are retained in a carriage, and integration or multiplication is accomplished by traversing the balls across the face of the disk and parallel to the axis of the cylinder.

Because the transmission of motion depends on friction between the various parts of the integrator, there is produced a slippage which is a function of the output torque load and independent of the output speed. This slippage produces an error in the operation of the integrator. The present invention minimizes or eliminates this error by adding to the driving force of the integrator a force which is dependent on and proportional to the output torque of the integrator.

The invention will be better understood from the following description when considered in connection with the accompanying drawing and its scope is indicated by the appended claims.

The single FIGURE of the drawing is diagrammatic, showing a ball and disk integrator, the actual structure of which is well known to those skilled in the art. It includes a rotatable shaft 10 upon which is mounted a disk 11. A pair of balls 12 and 13 supported in movable carriage, indicated by the member 14, are located between the disk 11 and a cylinder 15. In the operation of the integrator, multiplication is accomplished by moving the balls 12 and 13 across the face of the disk 11 in a direction parallel to the axis of the cylinder 15. This multiplication can be expressed as $$\frac{xd}{R}$$

where $x$ = rotational displacement of the disk
$d$ = ball displacement from the center of the disk, and
$R$ = radius of the cylinder.

This product is represented by a rotational displacement of the cylinder 15 and its shaft 16. As previously indicated, this product contains an error which is produced by slippage between the disk 11, the balls 12 and 13 and the drum 15 and is a function of the output torque.

In order to minimize or eliminate this error, the output shaft 16 of the integrator is coupled to the load drive shaft 17 through gears 18 and 19 and a torsional member 20. Fixed to the shaft 17 is a gear 21 which drives a gear 22 of a differential 23. Another gear 24 of this differential engages a gear 25 which is mounted on the shaft 16 of the cylinder 15. The driving member of the differential 23 in this case, the cage which supports the secondary gears, is fixed to a shaft 26.

By this arrangement, the rotational displacement of the cylinder 15 is put into one primary of the differential through a rigid coupling and the same rotational displacement is put into the other primary through a torsional member. This means that the displacement of the shaft 26 is the resultant difference between the displacements of the gears 22 and 24.

As previously shown, the output of the integrator is $$\frac{xd}{R}$$

and theoretically, under no load, the differential 23 subtracts two like quantities resulting in zero. However, if a torque load is applied to the torsional member 20, its output becomes $$\frac{xd}{R} + \Delta\theta$$

$\Delta\theta$ represents the slippage within the integrator and by calibration and proper transposition it can be converted into additional displacement of the ball carriage 14 such that slippage is compensated and the output of the cylinder results in more accurate multiplication.

The driving member of a second differential 27 is fixed to the shaft 26. One of its primary gears 28 meshes with a gear 29. Mounted on the same shaft 30 as the gear 29 is a gear 31 which meshes with a rack on the carriage 14. The other primary gear 32 of the differential 27 meshes with a gear 33 fixed to a shaft 34. This second differential, into which slippage is fed, merely provides a mechanical means for adding together the initial displacement $d$ and the slip correction factor.

The differentials 23 and 27 are of a type having a drive shaft fixed to a cage bearing secondary gears which mesh with one another and each of which meshes with a different primary gear rotatable about the shaft to which the cage is fixed.

What the invention provides is a mechanism and a method of operation whereby there is fed back from the load shaft of a mechanical integrator a torque which is dependent on the torque of this shaft and functions to minimize the error otherwise produced by slippage between the various parts of the integrator.

I claim:

1. In a mechanical integrator wherein a pair of balls supported in carriage is movable across the face of a disk in a direction parallel with the axis of a cylinder having an output shaft, the combination therewith of a load drive shaft, a torsional member interconnecting said load drive shaft and said output shaft, a differential arranged to have one of its primary gears driven by said load drive shaft and the other of its primary gears driven by said output shaft, and means for adjusting the position of said carriage in accordance with output of said differential whereby the effect of slippage between the parts of said integrator is minimized.

2. A mechanical integrator according to claim 1 wherein said adjusting means includes a second differential having its output shaft connected to the output shaft of said first differential, one of its primary gears coupled to said carriage and the other of its primary gears in mesh with a manually adjustable gear.

References Cited in the file of this patent

UNITED STATES PATENTS

| | | |
|---|---|---|
| 1,317,916 | Ford | Oct. 7, 1919 |
| 1,896,527 | Houghton | Feb. 7, 1933 |
| 2,059,423 | Weiss | Nov. 3, 1936 |
| 2,540,989 | Newell | Feb. 6, 1951 |

OTHER REFERENCES

Burgess: "Can You Use an Unusual Computing Device?" Control Engineering, October 1954, pages 32–34.